United States Patent
Smith et al.

(10) Patent No.: US 11,215,056 B2
(45) Date of Patent: Jan. 4, 2022

(54) THERMALLY ISOLATED ROTOR SYSTEMS AND METHODS

(71) Applicant: UNITED TECHNOLOGIES CORPORATION, Farmington, CT (US)

(72) Inventors: Gabriel P. Smith, East Haddam, CT (US); John C. DiTomasso, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 50 days.

(21) Appl. No.: 16/844,896

(22) Filed: Apr. 9, 2020

(65) Prior Publication Data
US 2021/0317743 A1 Oct. 14, 2021

(51) Int. Cl.
*F01D 11/08* (2006.01)
*F01D 5/08* (2006.01)
*F01D 11/00* (2006.01)

(52) U.S. Cl.
CPC ............ *F01D 5/084* (2013.01); *F01D 11/008* (2013.01); *F05D 2240/11* (2013.01); *F05D 2240/59* (2013.01); *F05D 2240/81* (2013.01); *F05D 2260/221* (2013.01); *F05D 2260/941* (2013.01)

(58) Field of Classification Search
None
See application file for complete search history.

(56) References Cited

U.S. PATENT DOCUMENTS

| | | | |
|---|---|---|---|
| 2,656,147 A | 10/1953 | Brownhill et al. | |
| 4,730,982 A | 3/1988 | Kervistin | |
| 5,482,433 A * | 1/1996 | Norris | F01D 9/044 415/173.7 |
| 5,639,210 A * | 6/1997 | Carpenter | E05B 35/001 415/135 |
| 7,775,764 B2 | 8/2010 | Snowsill et al. | |
| 8,500,394 B2 * | 8/2013 | Major | F01D 17/162 415/160 |
| 9,844,826 B2 * | 12/2017 | Tucker | B23K 1/0018 |
| 9,938,831 B2 | 4/2018 | Suciu et al. | |
| 9,988,935 B2 | 6/2018 | Hill et al. | |
| 10,161,251 B2 | 12/2018 | Bintz et al. | |
| 2003/0133788 A1 | 7/2003 | Avignon et al. | |
| 2007/0297897 A1 * | 12/2007 | Tran | F01D 11/001 415/170.1 |
| 2008/0008582 A1 * | 1/2008 | Pickens | F01D 11/001 415/174.2 |
| 2010/0124495 A1 | 5/2010 | Bifulco | |

(Continued)

OTHER PUBLICATIONS

International Searching Authority, International Search Report and Written Opinion dated Aug. 17, 2021 in Application No. PCT/US2021/025804.

*Primary Examiner* — Michael Lebentritt
(74) *Attorney, Agent, or Firm* — Snell & Wilmer L.L.P.

(57) ABSTRACT

A rotor assembly of a gas-turbine engine may comprise a first rotor blade, a second rotor blade, a third rotor blade, a first platform sealing assembly and a second platform sealing assembly. The first platform sealing assembly may be disposed between a first platform of the first rotor blade and a second platform of the second rotor blade. The second platform sealing assembly may be disposed between the second platform and a third platform of the third rotor blade.

19 Claims, 6 Drawing Sheets

(56) References Cited

U.S. PATENT DOCUMENTS

| | | | |
|---|---|---|---|
| 2013/0108445 A1 | 5/2013 | Suciu et al. | |
| 2014/0140827 A1* | 5/2014 | Hagan | F02C 7/28 415/174.5 |
| 2015/0369047 A1* | 12/2015 | McCaffrey | F01D 5/12 416/95 |
| 2015/0369071 A1 | 12/2015 | Alvanos | |
| 2016/0003166 A1* | 1/2016 | Mosley | F01D 5/082 416/95 |
| 2016/0108738 A1* | 4/2016 | Devore | F01D 25/12 415/177 |
| 2016/0169020 A1* | 6/2016 | Ryan | F01D 9/041 415/173.3 |
| 2016/0376904 A1* | 12/2016 | Schwarz | F16J 15/442 415/230 |
| 2017/0009596 A1* | 1/2017 | Schwarz | F01D 11/02 |
| 2017/0198708 A1* | 7/2017 | Wilber | F01D 11/02 |
| 2018/0142564 A1* | 5/2018 | Taglieri | F01D 25/246 |
| 2018/0209290 A1* | 7/2018 | Port | F04D 29/164 |
| 2019/0010956 A1 | 1/2019 | Ditomasso et al. | |
| 2019/0040753 A1* | 2/2019 | Spangler | F01D 25/12 |
| 2020/0340369 A1 | 10/2020 | Benjamin | |
| 2021/0180463 A1* | 6/2021 | McCaffrey | F01D 11/003 |

\* cited by examiner

THERMALLY ISOLATED ROTOR SYSTEMS AND METHODS

FIELD

The present disclosure relates to gas turbine engines, and more specifically, blade stages of gas turbine engines.

BACKGROUND

As higher pressures are achieved in compressors of gas turbine engines, the temperature of compressed air leaving the compressors may increase as well. As a result, the temperature differential in rotor disks of a compressor or turbine may cause thermal stress. For example, temperatures at the distal end of blades mounted to a rotor disk of a high-pressure compressor may reach 1,500° F. (815° C.) as a gas turbine engine accelerates. Meanwhile, the proximal portion of the rotor disk upon which the blade is mounted may only be at 400° F. (205° C.). The resulting temperature gradient in the rotor disk may decrease its longevity.

SUMMARY

A rotor assembly of a gas-turbine engine is disclosed herein. The rotor assembly may comprise: a first rotor blade comprising a first platform and a first rim, the first rim disposed radially inward of the first platform, the first rim including an aft axial shroud extending aft from the first rim; a second rotor blade comprising a second platform and a second rim, the second rim disposed radially inward of the second platform, the second rotor blade disposed aft of the first rotor blade; a third rotor blade comprising a third platform and a third rim, the third rim disposed radially inward of the third platform, the third rotor blade disposed aft of the second rotor blade, the third rim comprising a forward axial shroud extending forward from the first rim, the aft axial shroud and the forward axial shroud coupled to the second rim; a first platform sealing assembly disposed between the first platform and the second platform; and a second platform sealing assembly disposed between the second platform and the third platform.

In various embodiments, the first rotor blade and the second rotor blade are each monolithic components, wherein the third rotor blade comprises a rotor disk and a blade, and wherein the rotor disk and the blade are discrete components. The first platform sealing assembly and the second platform sealing assembly may comprise a knife seal assembly. The first platform sealing assembly and the second platform sealing assembly may each comprise an annular spacer. The annular spacer may comprise a forward shoulder and an after shoulder configured to have a radial interference fit with a respective platform. The first rotor blade, the second rotor blade, and the third rotor blade are coupled together by a radial interference fit. The rotor assembly may further comprise a flow guide disposed forward of the first rotor blade, the flow guide configured to bleed air flow from a core-flow path into a cooling plenum defined by the rotor assembly.

A cooling system for an aft rotor disk in a gas turbine engine is disclosed herein. The cooling system may comprise: a first rotor blade; a second rotor blade disposed aft of the first rotor blade; a third rotor blade disposed aft of the second rotor blade; a radially outer shroud at least partially defined by a first platform of the first rotor blade, a second platform of the second rotor blade, and a third platform of the third rotor blade; and a radially inner shroud defined by a first axial shroud extending aft from a first rim of the first rotor blade to a second rim of the second rotor blade, the second rim, and a third axial shroud extending forward from a third rim of the third rotor blade, wherein the radially outer shroud and the radially inner shroud at least partially define a cooling channel.

In various embodiments, the first rotor blade may comprise a first radial wall extending radially outward from the first rim to the first platform, wherein the first radial wall comprises a first plurality of apertures disposed axially therethrough, wherein the second rotor blade comprises a second radial wall extending radially outward from the second rim to the second platform, and wherein the second radial wall comprises a second plurality of apertures disposed therethrough. The third rotor blade may comprise a third radial wall extending radially outward from the third rim. The third radial wall may comprise a plurality of cooling channels, and a blade of the third rotor blade may be coupled to a rotor disk and partially filling the plurality of cooling channels. The first axial shroud and the third axial shroud may be coupled to the second rim by a radial interference fit. The cooling system may further comprise a first knife edge seal assembly extending from the first platform to the second platform and a second knife edge seal assembly extending from the second platform to the third platform. The cooling system may further comprise an aft hub coupled to the third rotor blade and a third knife edge seal assembly disposed between the aft hub and the third rotor blade. The cooling system may further comprise a flow guide disposed forward of the first rotor blade.

A gas turbine engine is disclosed herein. The gas turbine engine may comprise: a multi-stage compressor including a plurality of rotor blades, each rotor blade disposed axially adjacent to an adjacent rotor blade, the plurality of rotor blades including an aft-most rotor blade assembly, the aft-most rotor blade assembly comprising a rotor disk coupled to a blade, wherein the rotor disk and the blade are discrete components, and wherein a remainder of the plurality of rotor blades are monolithic rotor blades.

In various embodiments, the plurality of rotor blades may further comprise a first rotor blade disposed forward of the aft-most rotor blade assembly and a second rotor blade disposed forward of the first rotor blade, the first rotor blade and the second rotor blade at least partially defining a cooling channel disposed radially inward from a core flow path of the gas turbine engine. The gas turbine engine may further comprise a first annular spacer disposed between the first rotor blade and the aft-most rotor blade assembly and a second annular spacer disposed between the first rotor blade and the second rotor blade, the first annular spacer and the second annular spacer configured to seal the cooling channel from the core flow path. The first annular spacer may be coupled to a first platform of the first rotor blade and an aft-most platform of the aft-most rotor blade assembly, and the second annular spacer may be coupled to the first platform of the first rotor blade and a second platform of the second rotor blade. The gas turbine engine may further comprise a flow guide disposed forward of the second rotor blade, wherein the flow guide is configured to bleed an airflow from the core flow path. The gas turbine engine may further comprise a first knife edge seal assembly disposed between the first rotor blade and the aft-most rotor blade assembly and a second knife edge seal assembly disposed between the first rotor blade and the second rotor blade.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

Figure 1A:
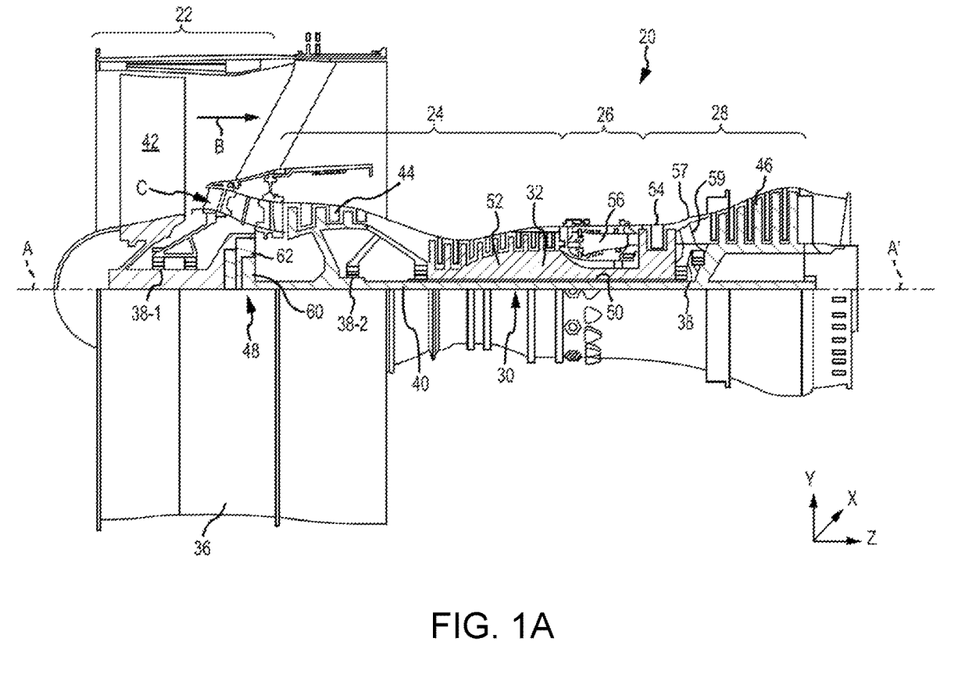
FIG. 1A is a cross-sectional view of an exemplary gas turbine engine, in accordance with various embodiments.

In various embodiments and with reference to FIG. 1A, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 1B:
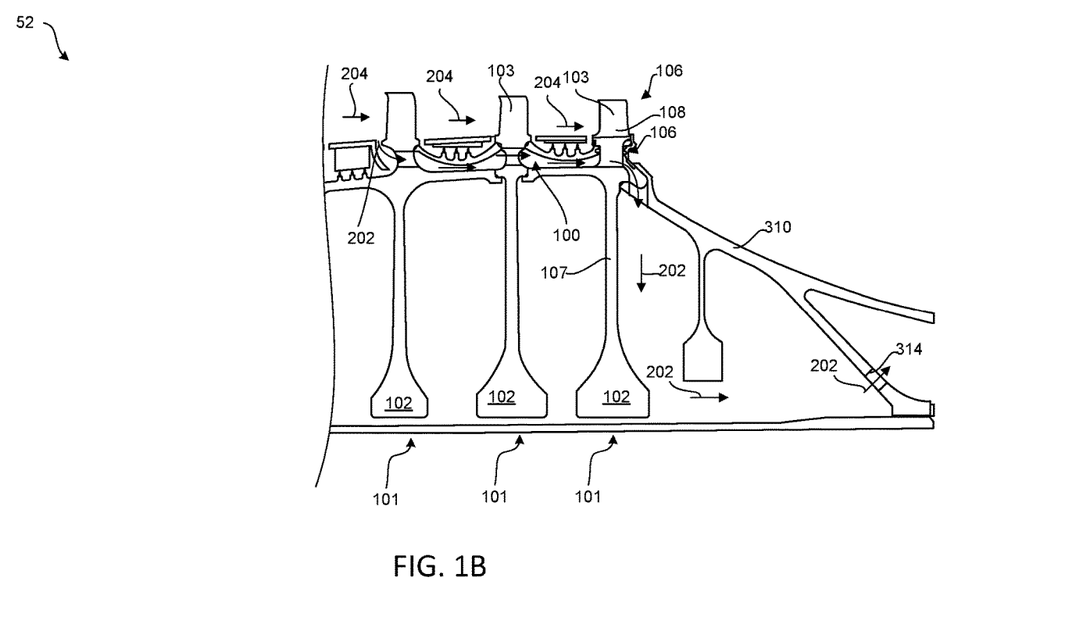
FIG. 1B is a cross-sectional view of a compressor section of a gas turbine engine, in accordance with various embodiments.

In various embodiments, and with reference to FIG. 1B, a portion of high pressure compressor 52 of the compressor section 24 of gas turbine engine 20 is provided. The high pressure compressor 52 includes a plurality of blade stages 101 (i.e., rotor stages) and a plurality of vane stages disposed between adjacent blade stages in the plurality of blade stages 101. The blade stages 101 may each include a rotor disk 102 and blades 103 extending radially outward from the rotor disk 102. In various embodiments, a cooling system 100 for aft stages of a compressor section is illustrated, as described in greater detail below. The gas turbine engine 20 may further include an aft-most blade stage assembly 106. In various embodiments, the aft-most blade stage assembly may comprise a rotor disk 107 coupled to a blade 108, wherein the rotor disk 107 and the blade 108 are discrete components. For example, the rotor disk 107 may comprise a first material and the blade 108 may comprise a second material. In various embodiments, the rotor disk 107 may comprise a higher strength material relative to the blade 108. In various embodiments, the blade 108 may comprise a higher temperature-resistant material relative to the rotor disk 107. In this regard, cooling system 100 may be configured to insulate the rotor disk 107 of aft-most blade stage assembly 106 from flow path temperatures exposed to the blade 108 of the aft-most blade stage assembly 106.

In various embodiments, the high pressure compressor 52 may further comprise an aft hub 310 and a shaft 110 (e.g., outer shaft 50 from FIG. 1A). The aft hub 310 may be coupled to the aft-most blade assembly 106 and the shaft 110. The shaft 110 may comprise a cooling aperture 314 disposed proximate an interface between the aft hub 310 and the shaft 110.

In various embodiments, the cooling system 100 may be configured to bleed airflow from a location forward of the aft-most blade stage assembly 106 from core flow path 204 (e.g., core flow-path C from FIG. 1A) along a cooling flow path 202. In this regard, rotor disk 107 may be configured to receive airflow from a forward location in the compressor and having a lower temperature relative to airflow of core flow path 204 disposed at the aft-most blade stage assembly 106 axial location. In various embodiments, cooling flow-path 202 may extend from at least two stages prior to the aft-most blade stage assembly 106 through a cooling plenum disposed radially inward from blades 103, radially inward from a radially outer structure of aft hub 310 aft through cooling aperture 314 to a low pressure sink in the turbine section (e.g., turbine section 28.

Figure 2:
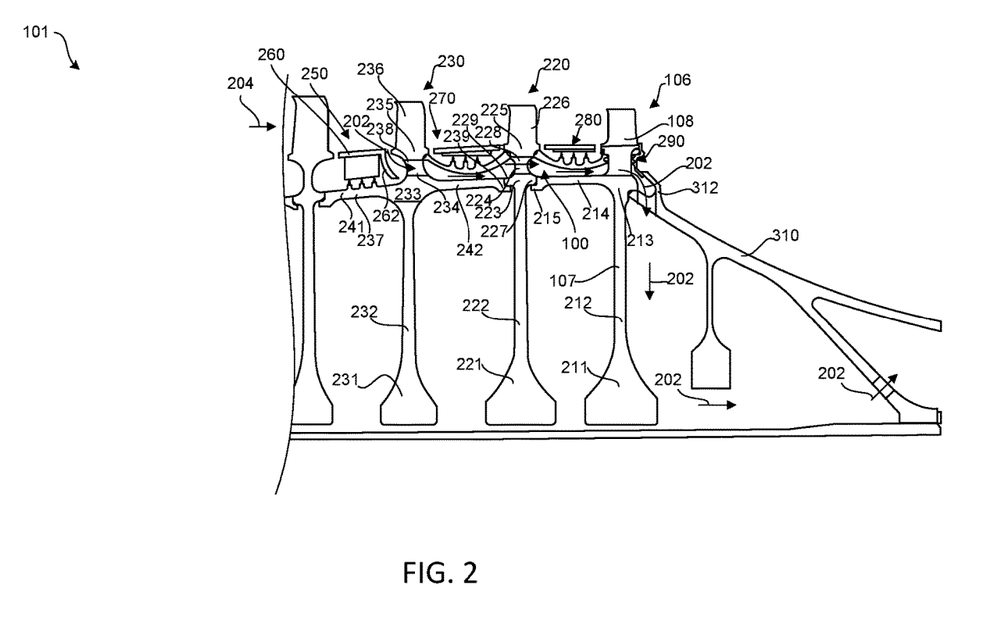
FIG. 2 is a cross-sectional view of a rotor assembly, in accordance with various embodiments.

Referring now to FIG. 2, a multi-stage rotor assembly 101, in accordance with various embodiments, is illustrated. In various embodiments, rotor disk 107 of aft-most blade stage assembly 106 comprises a bore 211, a web 212, a rim 213, and an axial shroud 214. The web 212 extends radially outward from bore 211 to the rim 213. The rim 213 is configured to be coupled to the blade 108. In various embodiments, an axial shroud 214 extends forward from the rim 213. In various embodiments, a forward end of the axial shroud 214 may define a shoulder 215 configured to interface with a rim of an adjacent rotor disk 102 disposed forward of the aft-most blade stage assembly 106. For example, shoulder 215 may be configured to have a radial interference fit with an aft protrusion 227 of rim 223.

In various embodiments, blade stage assembly 220 is disposed forward and adjacent to the aft-most blade stage assembly 106. Blade stage assembly 220 may comprise a monolithic rotor disk 102 and a blade 103. A "monolithic component," as described herein means is a component without mechanical joints, such as fasteners, inserts, or the like. In various embodiments, the blade stage assembly 220 may comprise a bore 221, a web 222, a rim 223, a radial wall 224, a platform 225 and a blade 226. The web 222 extends radially outward from the bore 221 to the rim 223. The radial wall 224 extends radially outward from the rim 223 to the platform 225. The blade 226 extends radially outward from the platform 225. In various embodiments, the radial wall 224 comprises an aperture 228 disposed therethrough. The aperture 228 may partially define a cooling flow path 202 disposed between the platform 225 and the rim 223 of the blade stage assembly 220.

In various embodiments, blade stage assembly 230 is disposed forward and adjacent to the blade stage assembly 220. Blade stage assembly 230 may comprise a monolithic rotor disk 102 and a blade 103. In various embodiments, the blade stage assembly 230 may comprise a bore 231, a web 232, a rim 233, a radial wall 234, a platform 235, a blade 236, and an axial shroud 237. The web 232 extends radially outward from the bore 231 to the rim 233. The radial wall 234 extends radially outward from the rim 233 to the platform 235. The blade 236 extends radially outward from the platform 235. In various embodiments, the radial wall 234 comprises an aperture 238 disposed therethrough. The aperture 238 may partially define a cooling flow path 202 disposed between the platform 235 and the rim 233 of the blade stage assembly 230. The axial shroud 237 extends aft from rim 233. In various embodiments, an aft end of the axial shroud 237 may define a shoulder 239 configured to interface with rim 223 of blade stage assembly 220 disposed aft of the blade stage assembly 230. For example, shoulder 239 may be configured to have a radial interference fit with a forward protrusion 229 of rim 223.

In various embodiments, axial shroud 237 comprises a forward axial shroud 241 extending axially forward from rim 233 and an aft axial shroud 242 extending axially aft from the rim 233. The forward axial shroud may be coupled to a knife edge seal assembly 250 disposed between a radially outer shroud 260 and the forward axial shroud 241. The radially outer shroud 260 may partially define a flow guide 262 forward of blade 236 in fluid communication with the aperture 228 and the aperture 238. The flow guide 262 may be configured to bleed flow from core flow path 204 (e.g., core flow-path C from FIG. 1A).

In various embodiments, a knife edge seal assembly may be disposed between blade stage assembly 220 and blade stage assembly 230 and between blade stage assembly 220 and the aft-most blade stage assembly 106. For example, knife edge seal assembly 270 may extend from an aft end of platform 235 to a forward end of platform 225. In this regard, knife edge seal assembly 270 may be configured to seal air flow from core flow path 204 and air flow from cooling flow path 202. Similarly, a knife edge seal assembly 280 may extend from an aft end of platform 225 to a forward end of a platform 216 of blade 108.

In various embodiments, aft-most blade stage assembly 106 may be coupled to an aft hub 310 by a radial interference fit at rim 213 rotor disk 107. In various embodiments, a knife edge assembly 290 may extend from an aft end of platform 216 of blade 108 to a radial protrusion 312 of aft hub 310. In this regard, the cooling channel of cooling flow path 202 may be sealed from the core flow path 204.

Figure 3:
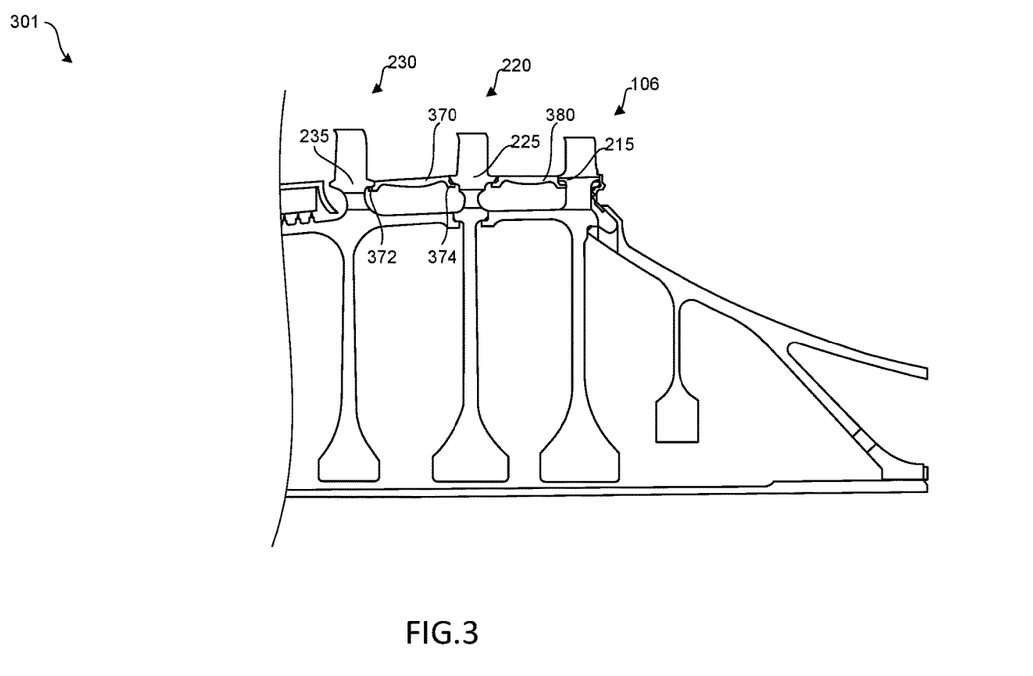
FIG. 3 is a cross-sectional view of a rotor assembly, in accordance with various embodiments.

Referring now to FIG. 3, a multi-stage rotor assembly 301, in accordance with various embodiments, is illustrated. In various embodiments, the multi-stage rotor assembly 301 comprises an aft-most blade stage assembly 106, a blade stage assembly 220 disposed forward of the aft-most blade stage assembly 106, and a blade stage assembly 230 disposed forward of the blade stage assembly 220. The multi-stage rotor assembly 301 may be in accordance with the multi-stage rotor assembly 301 with the exception of knife edge seal assembly 270 and knife edge seal assembly 280. In this regard, an annular spacer 370 may be disposed between platform 235 of blade stage assembly 230 and platform 225 of blade stage assembly 220, and an annular spacer 380 may be disposed between platform 225 of blade stage assembly 220 and aft-most blade stage assembly 106. The annular spacers 370 and 380 may each comprise an aft coupling portion and a forward coupling portion. For example, annular spacer 370 may comprise a shoulder 372 at a forward end and a should 374 at an aft end of the annular spacer 370. The shoulders 372, 374 may be configured to provide a radial interference fit with a respective platform. For example, shoulder 372 be coupled to the platform 235 of blade stage assembly 230 by a radial interference fit, or the like. Similarly, shoulder 374 may be coupled to the platform 225 of blade stage assembly 220 by a radial interference fit or the like. Referring back to FIG. 2, the knife edge seal assembly 270 and the knife edge seal assembly 280 may each be coupled to respective platforms in a manner similar to the annular spacers 370, 380, as described herein.

Figure 4:
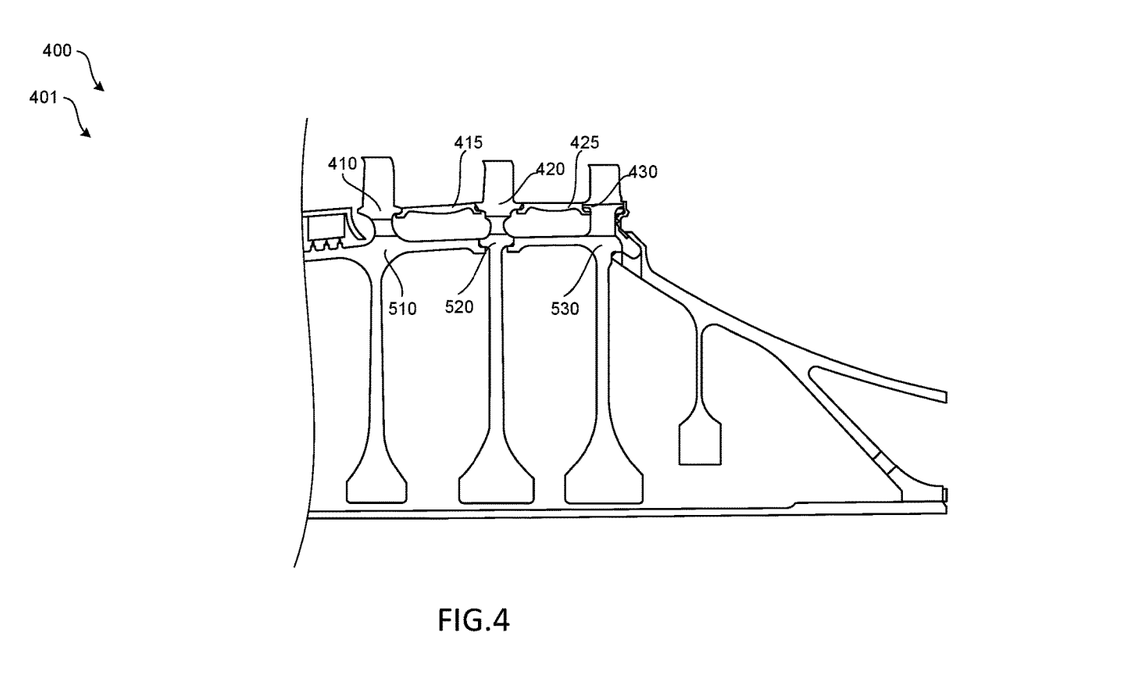
FIG. 4 is a cross-sectional view of a rotor assembly, in accordance with various embodiments.

Referring now to FIG. 4, a cooling system 400 for an aft rotor disk of a multi-stage rotor assembly 401 is illustrated, in accordance with various embodiments. The cooling system comprises a first platform 410, a second platform 420, a third platform 430, a first rim 510, a second rim 520, and a third rim 530. In various embodiments, the second platform 420 is disposed axially between the first platform 410 and the third platform 430. In various embodiments, the first rim 510 is disposed radially inward from the first platform 410, the second rim 520 is disposed radially inward form the second platform 420, and the third rim 530 is disposed radially inward form the third platform 430. In various embodiments, a first platform sealing assembly 415 is disposed between the first platform 410 and the second platform 420. Similarly, a second platform sealing assembly 425 is disposed between the second platform 420 and the third platform 430. The platform sealing assemblies 415, 425 may be in accordance with a knife edge seal assembly (e.g., knife edge sealing assemblies 270, 280, with momentary reference to FIG. 2) or in accordance with annular spacers (e.g., annular spacers 370, 380, with momentary reference to FIG. 4).

In various embodiments, the first rim 510 may comprise an axial shroud 512 extending aft from rim 510 toward rim 520. The axial shroud 512 may be coupled to the rim 520 by a radial interface fit. Similarly, the third rim 530 may comprise an axial shroud 532 extending forward from rim 530 toward rim 520. The axial shroud 532 may be coupled to the rim 520 by a radial interference fit. In this regard, the multi-stage rotor assembly 401 may provide enhanced manufacturability and assembly compared to typical multi-stage rotor assemblies.

Figures 5, 6, 7:
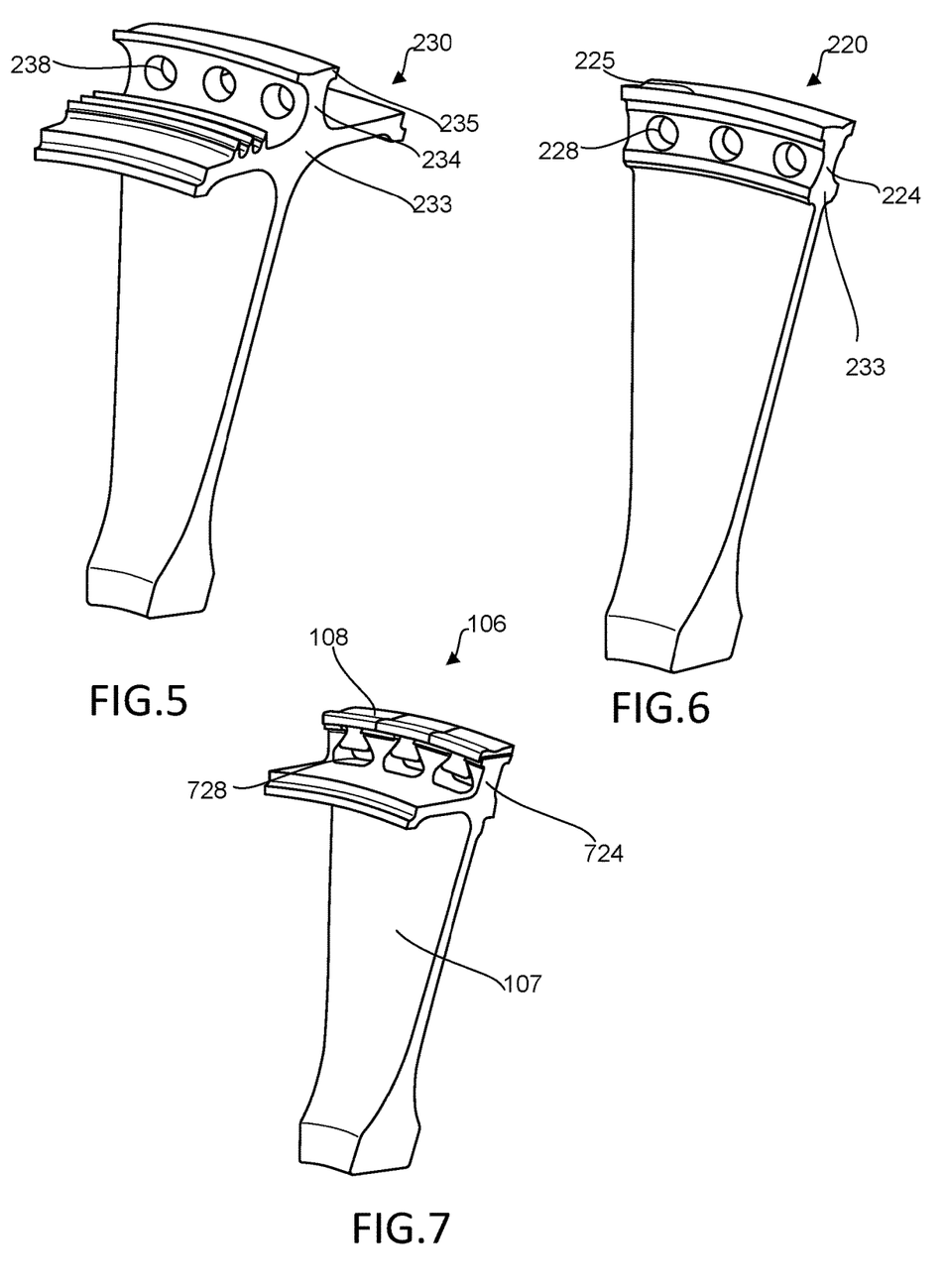
FIG. 5 is a perspective view of a portion of a rotor blade, in accordance with various embodiments.
FIG. 6 is a perspective view of a portion of a rotor blade, in accordance with various embodiments.
FIG. 7 is a perspective view of a portion of a rotor blade, in accordance with various embodiments.

Referring now to FIG. 5, a perspective view of a portion of the blade stage assembly 230 is illustrated, in accordance with various embodiments. As illustrated, the radial wall 234 between platform 235 and the rim 233 may comprise a plurality of the aperture 238 disposed therethrough. Each aperture in the plurality of the aperture 238 may be disposed axially through the radial wall 234. Each aperture may be disposed circumferentially adjacent to an adjacent aperture in the plurality of the aperture 238.

Referring now to FIG. 6, a perspective view of a portion of the blade stage assembly 220 is illustrated, in accordance with various embodiments. As illustrated, the radial wall 224 between platform 225 and the rim 223 may comprise a plurality of the aperture 228 disposed therethrough. Each aperture in the plurality of the aperture 228 may be disposed axially through the radial wall 224. Each aperture may be disposed circumferentially adjacent to an adjacent aperture in the plurality of the aperture 228.

Referring now to FIG. 7, a perspective view of a portion of the aft-most blade stage assembly 106 is illustrated, in accordance with various embodiments. As illustrated, the blade 108 may be coupled to the rotor disk 107 and fill a portion of cooling channels 728 disposed through a radial wall 724 of rotor disk 107. In this regard, rotor disk 107 and blade 108 may comprise different material, as described previously herein. Furthermore, the rotor disk 107 may be configured to only be exposed to cooler air flow from core flow path 204 in FIGS. 1B and 2 as opposed to core flow path 204 air flow at the axial location of the aft-most blade stage assembly 106.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotor assembly of a gas-turbine engine, the rotor assembly comprising:
a first rotor blade comprising a first platform and a first rim, the first rim disposed radially inward of the first platform, the first rim including an aft axial shroud extending aft from the first rim;
a second rotor blade comprising a second platform and a second rim, the second rim disposed radially inward of the second platform, the second rotor blade disposed aft of the first rotor blade;
a third rotor blade comprising a third platform and a third rim, the third rim disposed radially inward of the third platform, the third rotor blade disposed aft of the second rotor blade, the third rim comprising a forward axial shroud extending forward from the first rim, the aft axial shroud and the forward axial shroud coupled to the second rim;
a first platform sealing assembly disposed between the first platform and the second platform; and
a second platform sealing assembly disposed between the second platform and the third platform wherein;
the first platform sealing assembly and the second platform sealing assembly comprises a knife seal assembly.

2. The rotor assembly of claim 1, wherein the first rotor blade and the second rotor blade are each monolithic components, wherein the third rotor blade comprises a rotor disk and a blade, and wherein the rotor disk and the blade are discrete components.

3. The rotor assembly of claim 1, wherein the first platform sealing assembly and the second platform sealing assembly each comprise an annular spacer.

4. The rotor assembly of claim 3, wherein the annular spacer comprises a forward shoulder and an after shoulder configured to have a radial interference fit with a respective platform.

5. The rotor assembly of claim 1, wherein the first rotor blade, the second rotor blade, and the third rotor blade are coupled together by a radial interference fit.

6. The rotor assembly of claim 1, further comprising a flow guide disposed forward of the first rotor blade, the flow guide configured to bleed air flow from a core-flow path into a cooling plenum defined by the rotor assembly.

7. A cooling system for an aft rotor disk in a gas turbine engine, the cooling system comprising:
a first rotor blade;
a second rotor blade disposed aft of the first rotor blade;
a third rotor blade disposed aft of the second rotor blade;
a radially outer shroud at least partially defined by a first platform of the first rotor blade, a second platform of the second rotor blade, and a third platform of the third rotor blade; and
a radially inner shroud defined by a first axial shroud extending aft from a first rim of the first rotor blade to a second rim of the second rotor blade, the second rim, and a third axial shroud extending forward from a third rim of the third rotor blade,
wherein the radially outer shroud and the radially inner shroud at least partially define a cooling channel.

8. The cooling system of claim 7, wherein the first rotor blade comprises a first radial wall extending radially outward from the first rim to the first platform, wherein the first radial wall comprises a first plurality of apertures disposed axially therethrough, wherein the second rotor blade comprises a second radial wall extending radially outward from the second rim to the second platform, and wherein the second radial wall comprises a second plurality of apertures disposed therethrough.

9. The cooling system of claim 8, wherein the third rotor blade comprises a third radial wall extending radially outward from the third rim, wherein the third radial wall comprises a plurality of cooling channels, and wherein a blade of the third rotor blade is coupled to a rotor disk and partially filling the plurality of cooling channels.

10. The cooling system of claim 7, wherein the first axial shroud and the third axial shroud are coupled to the second rim by a radial interference fit.

11. The cooling system of claim 7, further comprising a first knife edge seal assembly extending from the first platform to the second platform and a second knife edge seal assembly extending from the second platform to the third platform.

12. The cooling system of claim 11, further comprising an aft hub coupled to the third rotor blade and a third knife edge seal assembly disposed between the aft hub and the third rotor blade.

13. The cooling system of claim 7, further comprising a flow guide disposed forward of the first rotor blade.

14. A gas turbine engine, comprising:
a multi-stage compressor including a plurality of rotor blades, each rotor blade disposed axially adjacent to an adjacent rotor blade, the plurality of rotor blades including an aft-most rotor blade assembly, the aft-most rotor blade assembly comprising a rotor disk coupled to a blade, wherein the rotor disk and the blade are discrete components, and wherein a remainder of the plurality of rotor blades are monolithic rotor blades.

15. The gas turbine engine of claim 14, wherein the plurality of rotor blades further comprise a first rotor blade disposed forward of the aft-most rotor blade assembly and a second rotor blade disposed forward of the first rotor blade, the first rotor blade and the second rotor blade at least partially defining a cooling channel disposed radially inward from a core flow path of the gas turbine engine.

16. The gas turbine engine of claim 15, further comprising a first annular spacer disposed between the first rotor blade and the aft-most rotor blade assembly and a second annular spacer disposed between the first rotor blade and the second rotor blade, the first annular spacer and the second annular spacer configured to seal the cooling channel from the core flow path.

17. The gas turbine engine of claim 16, wherein the first annular spacer is coupled to a first platform of the first rotor blade and an aft-most platform of the aft-most rotor blade assembly, and wherein the second annular spacer is coupled to the first platform of the first rotor blade and a second platform of the second rotor blade.

18. The gas turbine engine of claim 16, further comprising a flow guide disposed forward of the second rotor blade, wherein the flow guide is configured to bleed an airflow from the core flow path.

19. The gas turbine engine of claim 16, further comprising a first knife edge seal assembly disposed between the first rotor blade and the aft-most rotor blade assembly and a second knife edge seal assembly disposed between the first rotor blade and the second rotor blade.

* * * * *